United States Patent [19]

Taggart

[11] 4,223,791
[45] Sep. 23, 1980

[54] FISHING ROD HOLDER

[75] Inventor: John K. Taggart, Indianapolis, Ind.

[73] Assignee: Plastilite Corporation, Omaha, Nebr.

[21] Appl. No.: 942,508

[22] Filed: Sep. 15, 1978

[51] Int. Cl.³ .............................................. A47F 7/00
[52] U.S. Cl. ................................. 211/120; 211/69.8; 211/60 R
[58] Field of Search ............. 211/120, 69.8, 89, 60 R, 211/60 T, 60 M, 67; 24/10 R, 252 R, 253

[56] References Cited
U.S. PATENT DOCUMENTS

| 58,363 | 10/1866 | Adair | 211/69.8 |
| 340,322 | 4/1886 | Keep | 211/69.8 |
| 501,196 | 7/1893 | Taylor | 211/120 |
| 642,277 | 1/1900 | Adair | 211/69.8 |
| 880,871 | 3/1908 | Fell | 211/120 X |
| 1,240,706 | 9/1917 | Gropengieser | 211/120 X |
| 2,238,532 | 4/1941 | Nöthe | 211/120 X |
| 3,789,996 | 2/1974 | Stroh | 211/119 X |

Primary Examiner—Roy D. Frazier
Assistant Examiner—Robert W. Gibson, Jr.
Attorney, Agent, or Firm—Henderson & Sturm

[57] ABSTRACT

This invention relates to a fishing rod holder for resiliently securing and holding a fishing rod or similar article, between the coils of a resiliently secured helical spring.

2 Claims, 8 Drawing Figures

FISHING ROD HOLDER

BACKGROUND OF THE INVENTION

A patentability search was conducted on this device and the most pertinent patents uncovered were as follows: U.S. Pat. Nos. 2,279,643; 3,135,393; 3,738,499; 2,605,907; 3,552,578; and 3,882,812.

All of the above patents disclose helical spring article holders, some of which could be employed to hold a fishing rod and others which obviously could not.

The use of a coiled spring to hold various articles is well known in the art; however, the present device is an improvement over the state of the art as will be apparent from the detailed description which follows.

SUMMARY OF THE INVENTION

This invention relates to a fishing rod holder for resiliently securing and holding a fishing rod or similar article. The device is designed to provide easy insertion and removal of the fishing rod while at the same time providing a secure gripping surface to maintain the rod in its stored position. It has long been a problem for fishermen to store their fishing rods either in a building or on a boat in such a manner that they are held securely yet readily accessible when needed. Rods which are not properly stored are subject to being broken, are a hazard to the occupants of a boat, and are subjected to the vibrations and pounding of the boat in rough seas which can damage both rod and reel. This invention solves all of the above problems by its unique combination of elements and interaction of its parts.

BRIEF DESCRIPTION OF THE DRAWINGS

In the drawings, although various modifications and alternate constructions can be made thereto without departing from the true spirit and scope of the invention, a preferred embodiment of the invention is illustrated, wherein.

DESCRIPTION OF THE PREFERRED EMBODIMENT

Figure 1:
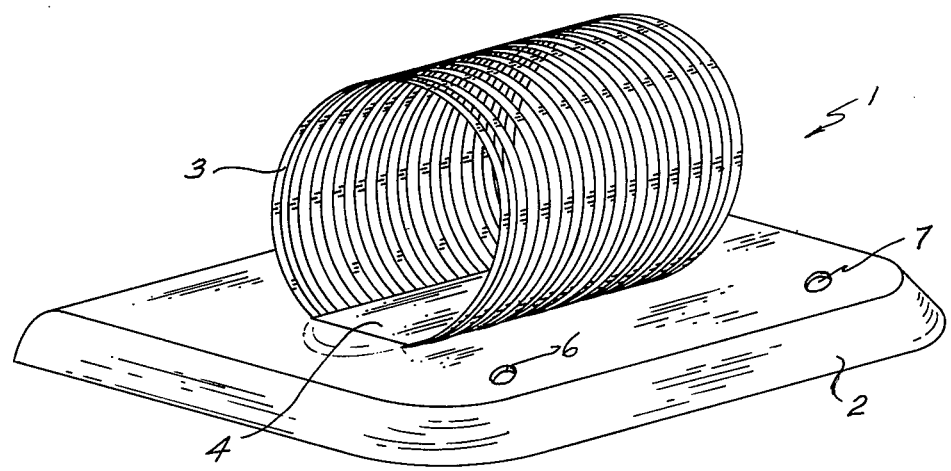
FIG. 1 is an isometric view of the device.

In FIG. 1 the fishing rod holder indicated generally as 1 comprises a base member 2, a helically wound spring 3 which is secured to the base member by means of a leaf spring 4. The base member 2 has a plurality of apertures 6 and 7 through which fastening members such as screws, bolts, nails, etc., may be inserted to secure the base member to a suitable support.

Figures 2, 3:
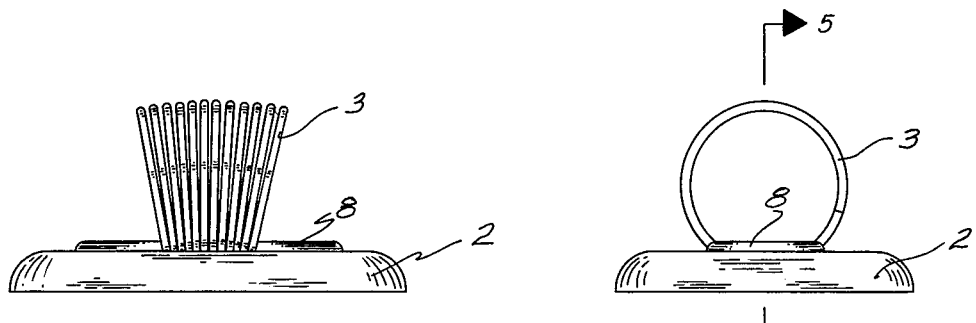
FIG. 2 is a front view of the device.
FIG. 3 is a side view of the device.
Figure 5:
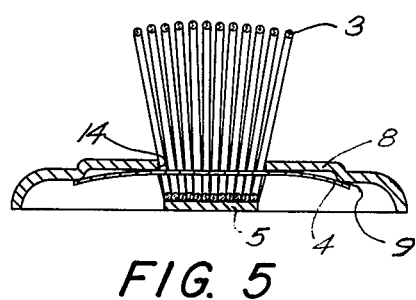
FIG. 5 is a sectional view of the device taken on the line 5—5 of FIG. 3.

As can best be seen by reference to FIGS. 2, 3 and 5, the base member 2 has raised portion 8 and an interior shoulder 9.

Figure 4:
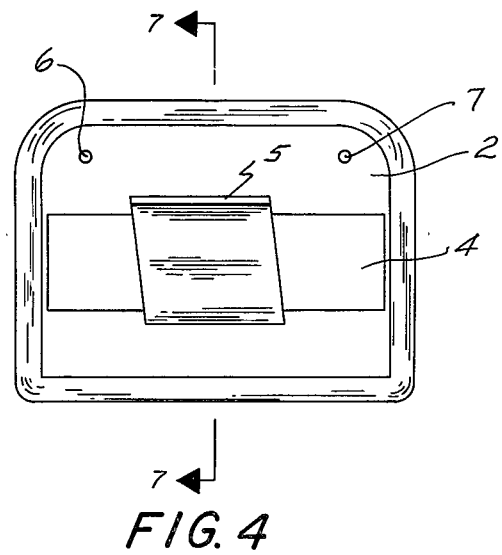
FIG. 4 is a bottom view of the device.
Figures 7, 8:
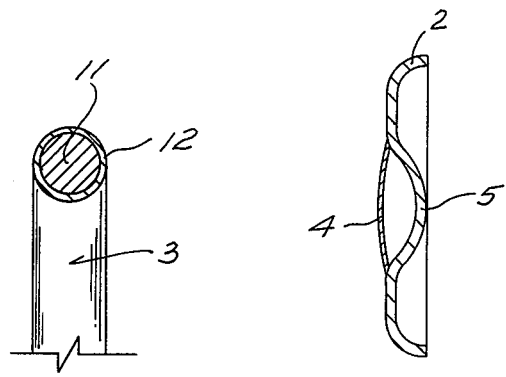
FIG. 7 shows a sectional view of the device taken on line 7—7 of FIG. 4.
FIG. 8 is a sectional view of the helical spring employed in this device.

Referring now to FIGS. 4, 5 and 7 it can be seen that the base member 2 has an arcuate recessed portion 5 on which the helical spring 3 rests, and through which the leaf spring 4 passes. In forming the arcuate recessed portion 5, an aperture 14 is created in the base member. The leaf spring 4 secures the helical spring 3 to the base member 2 and abutts the interior shoulder 9 and the underside of the raised portion 8.

In assembling the device, the helical spring 3 is compressed and inserted through the aperture 14. The leaf spring 4 is then inserted through the helical coils and the arcuate recessed portion 5, and is deformed by contact with the interior shoulder 9. The leaf spring 4 performs a dual function in that it retains the helical spring in the base member and biases the helical coil towards the arcuate recessed portion 5. The leaf spring 4 is inherently resilient, and thus, comprises a resilient retaining means, resiliently retaining the helical spring 3 in the base member 2.

As can be seen by reference to FIG. 8, the coils of the helical spring 3 consist of an inner metal core 11 which is coated with a resilient material 12 such as plastic or rubber. The purpose of the coated resilient material 12 is to (a) prevent scratching of the article to be gripped; (b) provide a high friction surface at the point of gripping contact; and (c) impart an element of vibration dampening to the assembled device.

Figure 6:
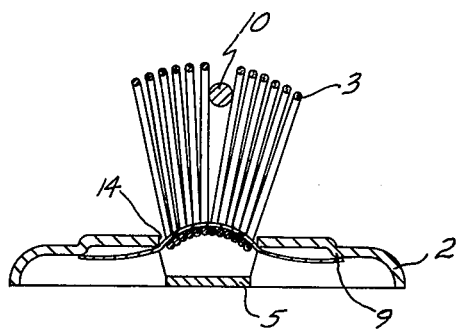
FIG. 6 shows the sectional view of FIG. 5 after an article has been placed between the coils of the device.

When an article 10 such as a fishing rod, is placed between the coils of the helical spring 3, several forces come into play to accomplish the gripping function. In addition to the normal restoring force of the helical spring 3 to return to its relaxed state, the helical spring has been pre-compressed by contact with the sides of the aperture 14, and the more the leaf spring 4 is deformed (see FIG. 6) as the article 10 is wedged between the coils of the helical spring, the greater is the bias of the leaf spring towards the arcuate recessed portion 5.

From the foregoing description, it will be appreciated that the fishing rod holder according to this invention offers many advantages over the prior art.

The concept of the fishing rod holder and its many applications is not limited to the specific embodiment as shown and variations therefrom may be made within the scope of the accompanying claims without sacrificing its chief advantages and protection to the broadest extent the prior art allows.

I claim:

1. A fishing rod holder, comprising
   (a) a base member having a recess therein;
   (b) a coiled spring mounted in said recess; and
   (c) resilient means for retaining said coiled spring in said base member; said resilient retaining means biasing said coiled spring against said base member, said coiled spring having an uncompressed state, said recess having a lengthwise dimension which is less than the lengthwise dimension of said coiled spring in said uncompressed state; wherein said resilient retaining means retains said coiled spring in said recess, said coiled spring having a top side and a bottom side and having a plurality of coils, said coiled spring being compressed longitudinally along the bottom side to fit within said recess in a first compressed state, said recess having two ends, the bottom side of said coiled spring being held in said first compressed state by a first compressive force exerted by the ends of said recess, said recess creating an aperture in said base, said resilient retaining means extending through said aperture and through said coiled spring, and exerting a first downward force against said coiled spring; the coils of said spring being pushed to an open position to hold a substantially cylindrical member, said open position giving rise to a normal restoring force in said coiled spring, the ends of said recess applying a second compressive force on the bottom side of said coiled spring when the coils are in said open position, said second compressive force causing said coiled spring to assume a second compressed state, said second compressive force being greater than said first compressive force, said coiled spring being in greater compression in said second compressed state than in said first compressed state, said resilient retaining means applying a second downward force on said coiled spring when the coils are in said open position, said second downward force being greater than said first downward force, said second compressive force together with said second downward force and said normal restoring force comprising a gripping force between the coils, said gripping force comprised of said forces increasing as the separation between the coils increases.

2. A fishing rod holder according to claim 1 further comprising a means for securing said base member to a suitable support.

* * * * *